(12) United States Patent
Sakai et al.

(10) Patent No.: US 9,641,762 B2
(45) Date of Patent: May 2, 2017

(54) IMAGING DEVICE AND IMAGING SYSTEM

(71) Applicant: Panasonic Intellectual Property Management Co., Ltd., Osaka (JP)

(72) Inventors: Takenori Sakai, Osaka (JP); Yoshihiro Tomikura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/557,490

(22) Filed: Dec. 2, 2014

(65) Prior Publication Data

US 2015/0163409 A1 Jun. 11, 2015

(30) Foreign Application Priority Data

Dec. 6, 2013 (JP) ................................. 2013-252646
Nov. 13, 2014 (JP) ................................. 2014-230816

(51) Int. Cl.
*H04N 5/232* (2006.01)
*H04N 5/265* (2006.01)
*H04N 5/225* (2006.01)

(52) U.S. Cl.
CPC ....... *H04N 5/23293* (2013.01); *H04N 5/2258* (2013.01); *H04N 5/23212* (2013.01); *H04N 5/265* (2013.01)

(58) Field of Classification Search
CPC .. H04N 5/23293; H04N 5/2258; H04N 5/272; H04N 5/265; H04N 5/23212
USPC ........................ 348/333.01–333.04, 345, 346
See application file for complete search history.

(56) References Cited

U.S. PATENT DOCUMENTS

| | | | |
|---|---|---|---|
| 5,752,090 A * | 5/1998 | Nagano | G03B 17/20 396/121 |
| 7,729,608 B2 * | 6/2010 | Okubo | G02B 26/004 348/220.1 |
| 2002/0149689 A1 * | 10/2002 | Sannoh | H04N 5/23293 348/333.02 |

(Continued)

FOREIGN PATENT DOCUMENTS

| | | |
|---|---|---|
| JP | 2004-282296 | 10/2004 |
| JP | 2005-073161 | 3/2005 |

(Continued)

*Primary Examiner* — Sinh Tran
*Assistant Examiner* — Zhenzhen Wu
(74) *Attorney, Agent, or Firm* — Wenderoth, Lind & Ponack, L.L.P.

(57) ABSTRACT

To notify that focusing operations are completed in an imaging device with a plurality of camera modules, in a form that is easy for a user to check. The imaging device of the present disclosure includes a display unit, a first imaging unit configured to generate a first image data by capturing a subject image, a second imaging unit configured to generate a second image data by capturing a subject image, and a controller configured to cause the display unit to display a superimposed image obtained by superimposing an image represented by the generated second image data on an image represented by the generated first image data, and to display a sign that a focusing operation on the subject image being captured by the second imaging unit is completed, in a position other than on the image represented by the second image data in the superimposed image.

16 Claims, 12 Drawing Sheets

(56) References Cited

U.S. PATENT DOCUMENTS

| | | | |
|---|---|---|---|
| 2005/0104992 A1* | 5/2005 | Aoyama | G02B 13/001 348/345 |
| 2006/0044452 A1* | 3/2006 | Hagino | G02B 7/28 348/345 |
| 2006/0055814 A1* | 3/2006 | Okawa | H04N 5/23293 348/346 |
| 2008/0025712 A1 | 1/2008 | Furuya | |
| 2009/0231454 A1* | 9/2009 | Miura | H04N 5/23212 348/220.1 |
| 2010/0321533 A1* | 12/2010 | Park | G06F 3/0481 348/239 |
| 2011/0018970 A1* | 1/2011 | Wakabayashi | H04N 5/2251 348/47 |
| 2011/0234881 A1* | 9/2011 | Wakabayashi | H04N 5/2251 348/333.05 |
| 2012/0008011 A1* | 1/2012 | Garcia Manchado | G03B 15/08 348/231.2 |
| 2012/0120186 A1* | 5/2012 | Diaz | H04N 5/2258 348/36 |
| 2012/0212661 A1* | 8/2012 | Yamaguchi | G02B 7/38 348/346 |
| 2012/0300051 A1* | 11/2012 | Daigo | H04N 5/2258 348/77 |
| 2013/0050532 A1 | 2/2013 | Ueda et al. | |
| 2013/0235224 A1* | 9/2013 | Park | H04N 5/23222 348/218.1 |

FOREIGN PATENT DOCUMENTS

| | | |
|---|---|---|
| JP | 2008-035348 | 2/2008 |
| JP | 2010-226496 | 10/2010 |
| JP | 2013-046292 | 3/2013 |
| JP | 2015-088985 | 5/2015 |

\* cited by examiner

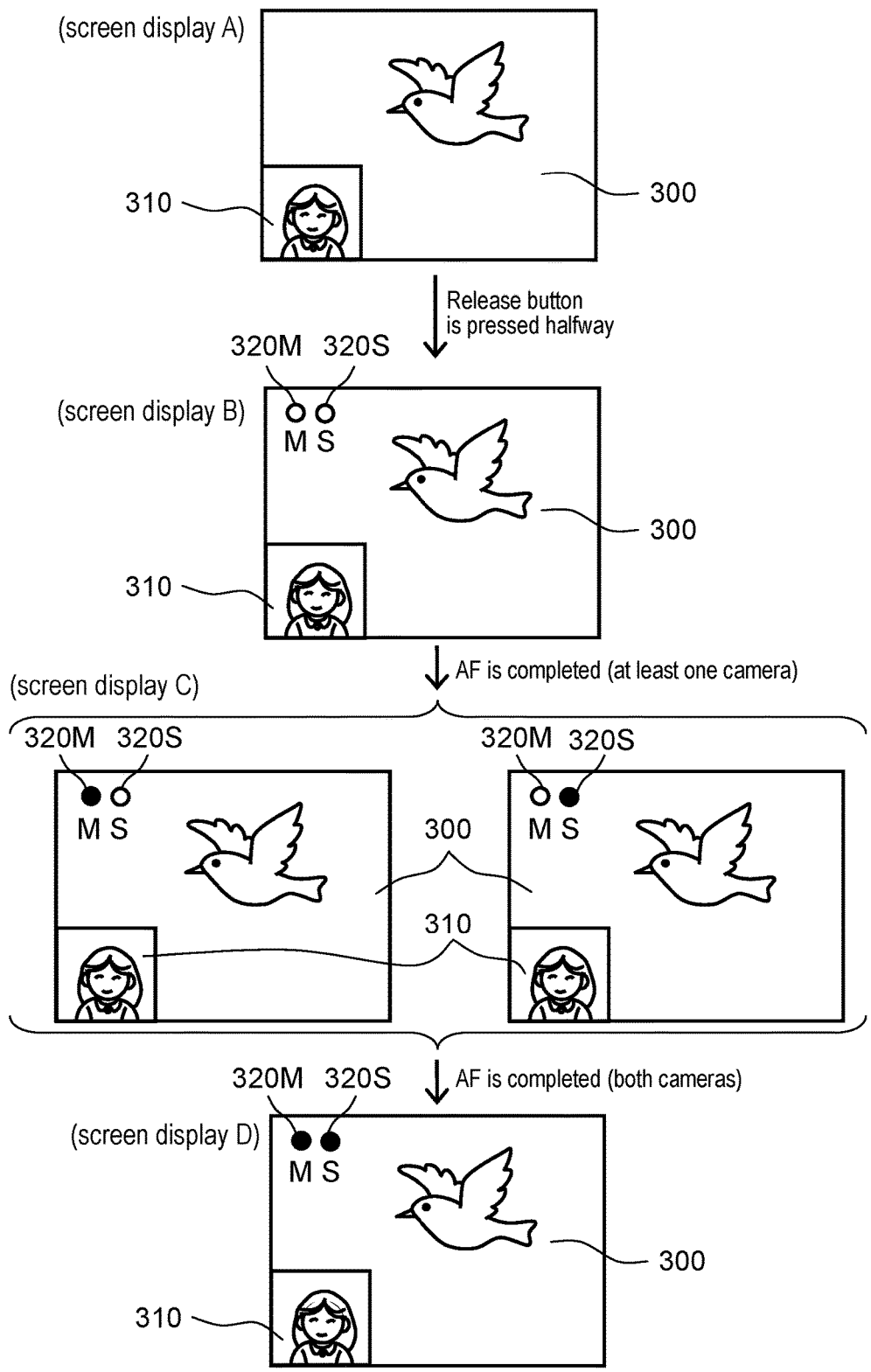

IMAGING DEVICE AND IMAGING SYSTEM

BACKGROUND

1. Technical Field

The present disclosure relates to an imaging device and an imaging system.

2. Description of the Related Art

There is widely spread digital cameras each having an auto focus function in which a focus lens is automatically driven to be focused on a subject (refer to PTL 1, for example).

CITATION LIST

Patent Literature

PTL 1: Unexamined Japanese Patent Publication No. 2013-46292

SUMMARY

When the auto focus function is used, if an imaging device is configured so as to notify a user that a focusing operation on a subject is completed, the convenience of the user will be enhanced.

In a case where the imaging device includes a plurality of camera modules, there may occur a case where the focusing operation is not yet completed in one camera module, but is completed in another camera module. For this reason, in an imaging device with a plurality of camera modules, it is particularly desired to notify a user that the focusing operations are completed, in a form that is easy for the user to check.

According to the present disclosure, in an imaging device with a plurality of camera modules, a notification is made that the focusing operations are completed, in a form that is easy for the user to check.

In order to solve the above problems, the imaging device of the present disclosure includes a display unit, a first imaging unit configured to generate a first image data by capturing a subject image, a second imaging unit configured to generate a second image data by capturing a subject image, and a controller configured to cause the display unit to display a display image including at least a superimposed image obtained by superimposing an image represented by the generated second image data on an image represented by the generated first image data, and to display a sign that a focusing operation on the subject image being captured by the second imaging unit is completed, in a position other than on the image represented by the second image data in the display image including at least the superimposed image.

According to the present disclosure, in an imaging device with a plurality of camera modules, it is possible to notify that the focusing operations are completed, in a form that is easy for the user to check.

BRIEF DESCRIPTION OF DRAWINGS

FIG. 11 is a conceptual transition diagram of a screen display that displays the respective in-focus marks of the main camera and the sub camera according to yet another exemplary embodiment.

DETAILED DESCRIPTION OF THE PREFERRED EMBODIMENT

Hereinafter, exemplary embodiments will be described with reference to the accompanying drawings as appropriate. However, unnecessarily detailed description may occasionally be omitted. For example, detailed description of well-known matters and redundant description of substantially the same configurations may occasionally be omitted. The omission of these items is to avoid the following description from becoming unnecessarily redundant, and to ease understanding of those skilled in the art.

It should be noted that the inventors of the present disclosure provide the following description and the accompanying drawings for any person skilled in the art to fully understand the present disclosure, and do not intend to limit the subject matter described in the claims by the following description.

First Exemplary Embodiment

Figure 1A:
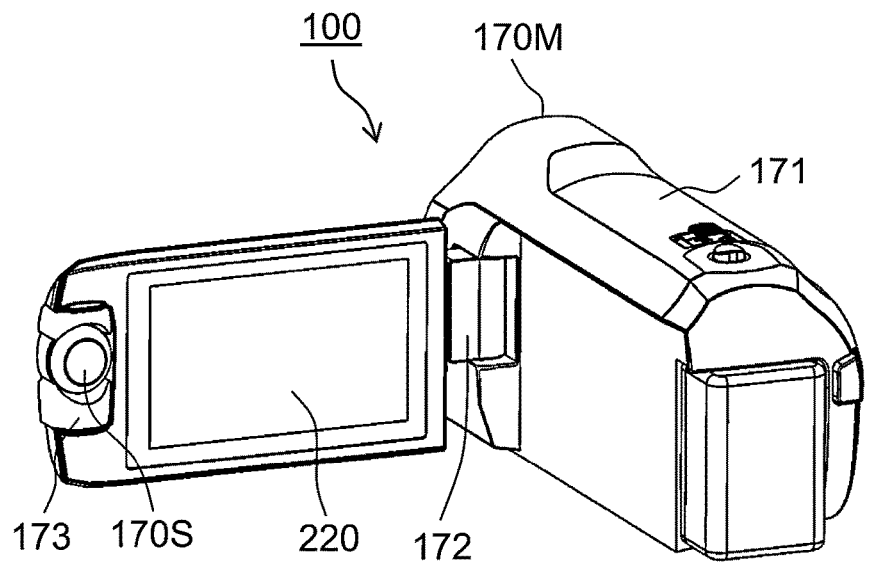
FIGS. 1A and 1B are external views each showing a digital video camera according to a first exemplary embodiment.
Figure 1B:
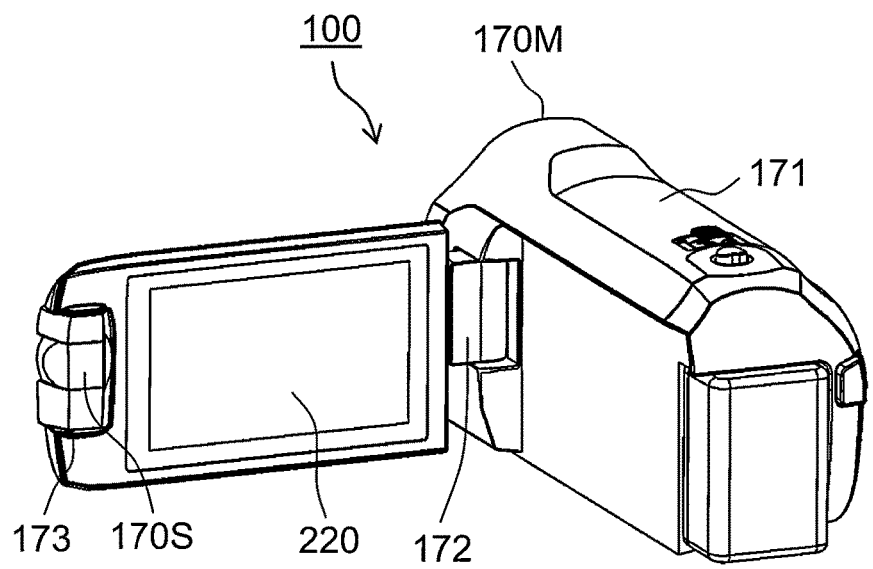

FIGS. 1A and 1B are external views each showing digital video camera 100. Digital video camera 100 includes main camera 170M being a camera module. In addition, in digital video camera 100, display monitor 220 is connected to camera body 171 via hinge unit 172. Moreover, at one end of display monitor 220, sub camera 170S (another camera module) is disposed via rotatable shaft mechanism 173. That is, digital video camera 100 includes main camera 170M and sub camera 170S. In digital video camera 100, sub camera 170S can rotate around the axis of rotatable shaft mechanism 173, and can change a photographing direction from a photographing direction facing a photographer side, as shown in FIG. 1A, to a photographing direction of main camera 170M facing a subject side, as shown in FIG. 1B. In addition, in digital video camera 100, display monitor 220 is openable and rotatable with respect to camera body 171 via hinge unit 172. Thereby, sub camera 170S is allowed to change the photographing direction variously.

Digital video camera 100 generates a PinP (Picture in Picture) image obtained by superimposing an image photographed by sub camera 170S on an image photographed by main camera 170M to display the generated PinP image on display monitor 220. The focus modes operated in main camera 170M and sub camera 170S include an auto focus mode (hereinafter referred to as "AF mode") and a manual focus mode (hereinafter referred to as "MF mode"). Hereinafter, the configuration and the operation of digital video camera 100 will be described in detail. Digital video camera 100 is an example of imaging devices.

1. Electrical Configuration of Digital Video Camera

Figure 2:
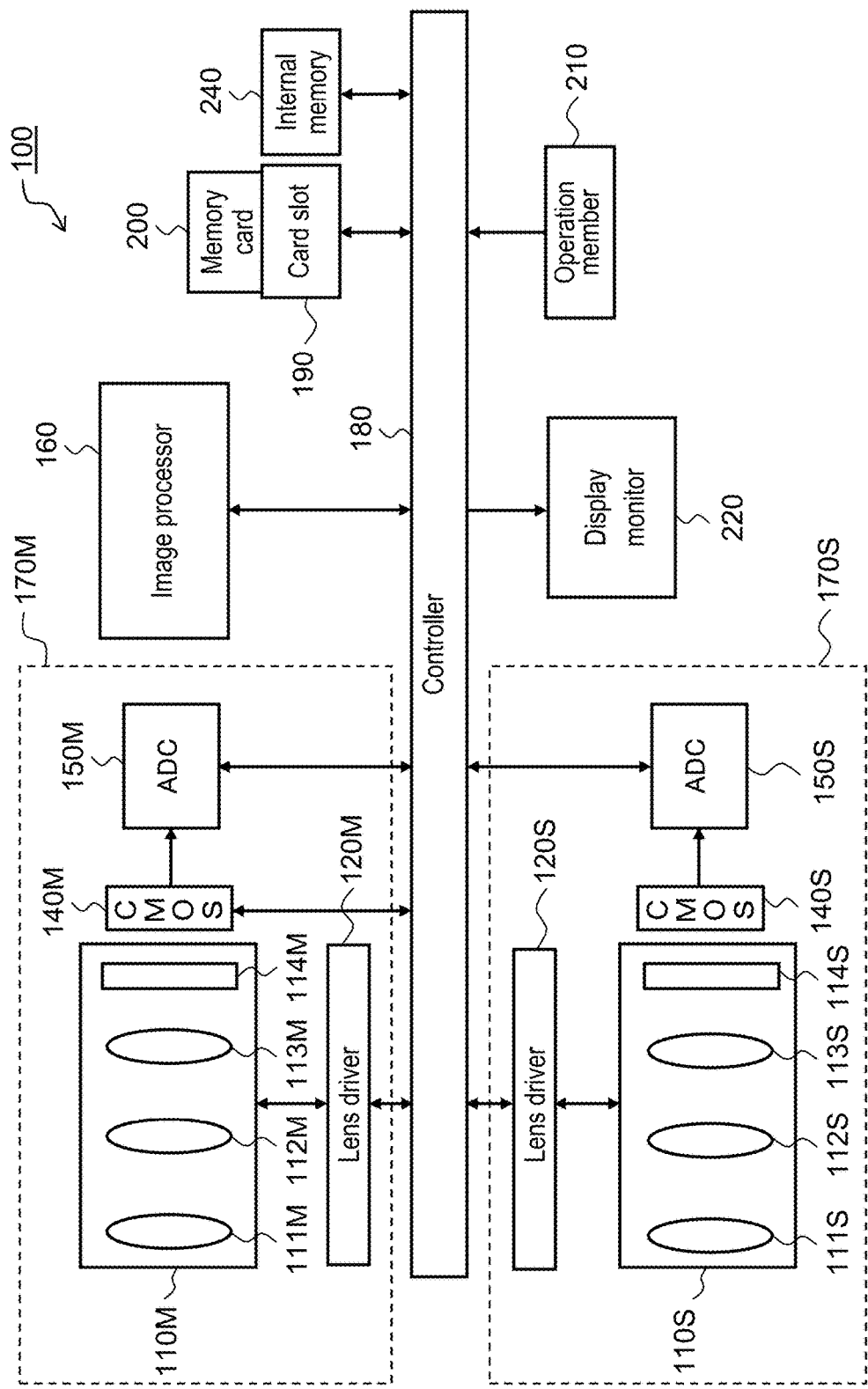
FIG. 2 is a block diagram showing an electrical configuration of the digital video camera according to the first exemplary embodiment.

FIG. 2 is a block diagram showing an electrical configuration of digital video camera 100. The electrical configuration of digital video camera 100 will be described with reference to FIG. 2.

As shown in FIG. 2, digital video camera 100 includes main camera 170M, sub camera 170S, controller 180, image processor 160, display monitor 220, card slot 190, internal memory 240, and operation member 210.

Main camera 170M includes optical system 110M, lens driver 120M, CMOS image sensor 140M, and A/D converter (ADC: Analog Digital Converter) 150M. Optical system 110M includes zoom lens 111M, image stabilization lens 112M, focus lens 113M, and aperture 114M.

Zoom lens 111M is a lens for changing the magnification of a subject image by moving along the optical axis. In addition, focus lens 113M is a lens for adjusting the focus of a subject image by moving along the optical axis. In addition, image stabilization lens 112M is a movable lens in a plane perpendicular to the optical axis of optical system 110M. By moving image stabilization lens 112M in a direction to cancel the shake of the digital video camera 100, it is possible to reduce the influence of the shake of digital video camera 100 on the captured image. In addition, aperture 114M adjusts the size of the opening and the amount of light passing through the opening according to a setting by a user or automatically.

Lens driver 120M includes a zoom actuator configured to drive zoom lens 111M, an image stabilization actuator configured to drive image stabilization lens 112M, a focus actuator configured to drive focus lens 113M, and an aperture actuator configured to drive aperture 114M. And, lens driver 120M controls the zoom actuator, the focus actuator, the image stabilization actuator, and the aperture actuator included in optical system 110M according to a control signal from controller 180.

CMOS image sensor 140M generates an image data by capturing a subject image formed by optical system 110M. CMOS image sensor 140M performs various operations such as exposure, transfer, and electronic shutter. ADC 150M converts an analog image data generated by CMOS image sensor 140M to a digital image data.

Sub camera 170S includes optical system 1105, lens driver 120S, CMOS image sensor 140S, and A/D converter 150S. Optical system 1105 includes zoom lens 1115, image stabilization lens 112S, focus lens 113S, and aperture 114S. In this exemplary embodiment, for the sake of simplicity of description, each configuration of sub camera 170S is assumed to be the same as a corresponding configuration of main camera 170M (a corresponding configuration is given the same reference numeral), and a detailed description will be omitted. However, each configuration of sub camera 170S may not necessarily be identical to the configuration of main camera 170M, and there may be a difference in specification.

Image processor 160 performs various processing on the image data generated in CMOS image sensor 140M in main camera 170M and CMOS image sensor 140S in sub camera 170S, and generates image data to be displayed on display monitor 220 and image data to be stored in memory card 200. For example, image processor 160 performs various processing such as gamma correction, white balance correction, and defect correction on the image data generated in CMOS image sensors 140M and 140S. In addition, image processor 160 generates a PinP image obtained by superimposing an image that is represented by the image data generated by CMOS image sensor 140S in sub camera 170S on an image that is represented by the image data generated by CMOS image sensor 140M in main camera 170M. In addition, image processor 160 compresses the image data generated in CMOS image sensors 140M and 140S by a compression format and the like that conforms to H.264 standard and MPEG2 standard. Image processor 160 uses a buffer memory (not shown) as a workspace as appropriate when performing various types of processing. Image processor 160 can be implemented by a DSP, a microcomputer, or the like.

Controller 180 is a control unit as control means configured to control digital video camera 100 as a whole. Controller 180 uses a buffer memory (not shown) as a workspace as appropriate when computing for the control operation. Controller 180 can be implemented by semiconductor elements and the like. Controller 180 may be configured by hardware only, and may be implemented by a combination of hardware and software. Controller 180 can be implemented by a microcomputer.

Memory card 200 can detachably be inserted into card slot 190. Card slot 190 can be connected with the memory card 200 mechanically and electrically. Memory card 200 includes, for example, a flash memory and a ferroelectric memory, and can store data such as an image file generated in image processor 160.

Internal memory 240 includes a flash memory and a ferroelectric memory. Internal memory 240 stores a control program and the like configured to control digital video camera 100 as a whole.

Operation member 210 is a generic term of a user interface configured to accept an operation from the user. Operation member 210 corresponds to, for example, a cross button, a decision button, an operation dial, a video recording start button (also serving as a video recording stop button), a release button configured to photograph a still image, and a video playback button configured to instruct that the playback of video data be started/stopped. The user can instruct each of main camera 170M and sub camera 170S to switch between MF mode and AF mode by operating operation member 210 (an operation dial, for example). The release button is a button with two stages of pressed states including a half pressed state and a fully pressed state. When release button is pressed halfway, controller 180 starts focusing operation by driving focus lens 113M and 113S. When the release button is fully pressed through the half-pressed state, controller 180 starts the recording operation of the image data based on the image that is being captured in CMOS image sensors 140M and 140S onto memory card 200.

It should be noted that operation member 210 may be a hardware key included in the exterior of digital video camera 100, and may be a software key enabling a user to operate a button icon displayed on display monitor 220 via a touch panel.

Display monitor 220 can display an image represented by the image data generated in CMOS image sensor 140M of main camera 170M and in CMOS image sensor 140S of sub camera 170S, and an image represented by the image data read from memory card 200. Display monitor 220 can also display a PinP image on which an image captured by main camera 170M is displayed large as a main screen and in which an image captured by sub camera 170S is superimposed small on part of the main screen as a sub screen.

When the release button is pressed halfway by the user, controller 180 starts focusing operation as described above. And, in main camera 170M and sub camera 170S which are set to AF mode, display monitor 220 displays an in-focus mark indicating that the focusing operation is in progress, or an in-focus mark indicating that the focusing operation is completed. It should be noted that display monitor 220 can also display various menu screens and the like for making various settings of digital video camera 100.

2. Operation of Digital Video Camera

Subsequently, still image photographing operation of digital video camera 100 will be described.

When the power of digital video camera 100 is turned on (ON), controller 180 supplies power necessary to each of units constituting digital video camera 100. By being supplied with power, the configurations of each of the lens constituting optical systems 110M and 110S, CMOS image sensors 140M and 140S, and the like complete the initial setting to an operable state.

Digital video camera 100 includes a photographing mode configured to photograph still or moving images, and a reproduction mode configured to reproduce images recorded on memory card 200. When digital video camera 100 is set to a photographing mode, CMOS image sensors 140M and 140S start the capturing of a subject image along with the power ON of digital video camera 100. Thus, display monitor 220 starts the display of a through image based on the image data which CMOS image sensors 140M and 140S generate. While viewing the through image displayed on display monitor 220, the user determines the angle of view, and presses the release button with a suitable timing for the start of the still image recording.

In digital video camera 100 according to this exemplary embodiment, each of main camera 170M and sub camera 170S can set the AF mode or MF mode independently. Therefore, the following four types of patterns can be considered depending on the setting: (1) main camera 170M set in AF mode, sub camera 170S set in AF mode; (2) main camera 170M set in AF mode, sub camera 170S set in MF mode; (3) main camera 170M set in MF mode, sub camera 170S set in AF mode; and (4) main camera 170M set in MF mode, sub camera 170S set in MF mode. In the following, the operation in these four types of patterns and the transition of the display of display monitor 220 will be sequentially described with reference to FIGS. 3 to 7.

[2-1. Main Camera Set in AF Mode, Sub Camera Set in AF Mode]

First, the operation when main camera 170M is set in AF mode and sub camera 170S is set in AF mode, and the transition of the display of display monitor 220 will be described with reference to FIGS. 3 and 4.

Figure 3:
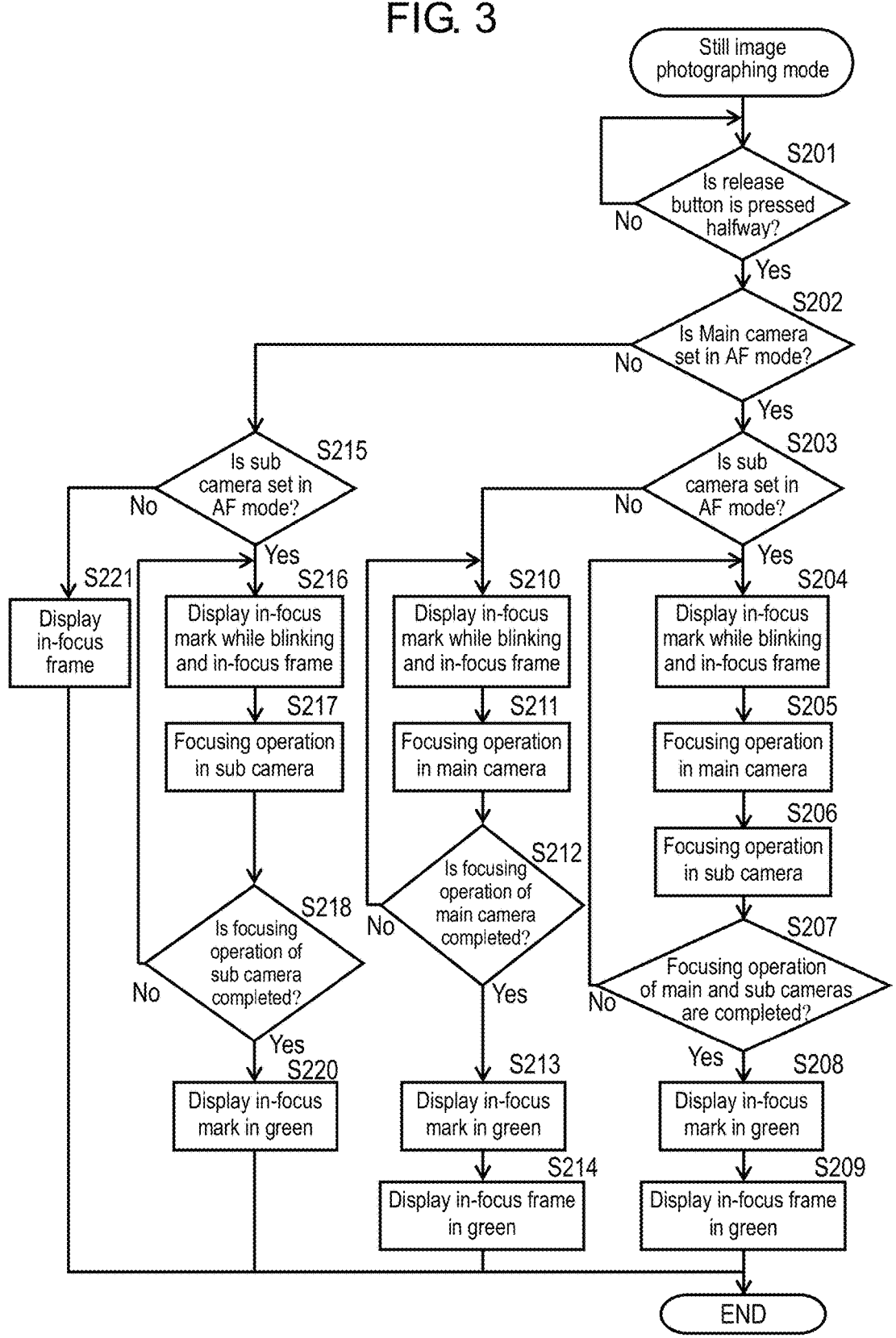
FIG. 3 is a flow chart for explaining still image photographing in the digital video camera according to the first exemplary embodiment.

FIG. 3 is a flow chart for explaining still image photographing in digital video camera 100. FIG. 4 is a conceptual transition diagram of the screen display when photographing by main camera 170M is in AF mode, and photographing by sub camera 170S is in AF mode.

Figure 4:
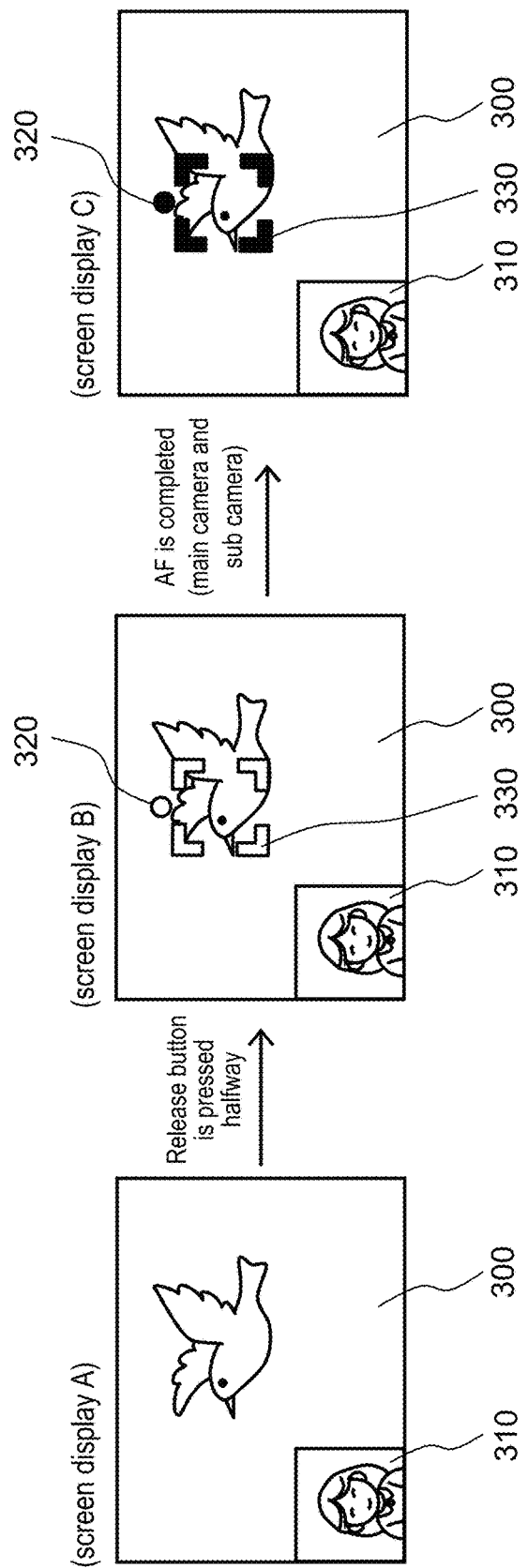
FIG. 4 is a conceptual transition diagram of a screen display when the photographing by a main camera is in an auto focus (AF) mode and the photographing by a sub camera is in AF mode according to the first exemplary embodiment.

When in the photographing mode, display monitor 220 displays a through image based on the image data that CMOS image sensors 140M and 140S generate, as shown in screen display A in FIG. 4. In this case, an image based on the image data that CMOS image sensor 140M captures is referred to as main camera image 300. Similarly, an image based on the image data that CMOS image sensor 140S captures is referred to as sub camera image 310. As shown in screen display A in FIG. 4, display monitor 220 displays the PinP image where sub camera image 310 is superimposed on main camera image 300. In this case, in PinP image, the area occupied by main camera image 300 is larger than the area occupied by sub camera image 310. Thereby, even while the subject to be the main is being displayed large as main camera image 300, the subject to be the sub can be referenced by being displayed as sub camera image 310.

Controller 180 monitors whether the release button is pressed halfway (step S201). Before the release button is half-pressed, controller 180 continues the through image display as shown in screen display A of FIG. 4. In this case, main camera 170M is set in AF mode ("Yes" in step S202), and sub camera 170S is set in AF mode ("Yes" in step S203). For this reason, when the release button is pressed halfway, controller 180 shifts the display contents of display monitor 220 from the display contents shown in screen display A of FIG. 4 to the display contents shown in screen display B of FIG. 4. In this case, as shown in screen display B in FIG. 4, display monitor 220 displays in-focus mark 320 in white while blinking, and displays main camera in-focus frame 330 in white (step S204).

The white blinking display of focus mark 320 is a display showing that both or at least one of main camera 170M and sub camera 170S, which are set in AF mode, are in focusing operation (focusing operation is not completed). By viewing the white blinking display of in-focus mark 320, the user can grasp that both or at least one of main camera 170M and sub camera 170S, which are set in AF mode, are in focusing operation. Although the white blinking display of in-focus mark 320 is the display relating to the focusing operation in sub camera 170S, the blinking display is displayed on main camera image 300, and not displayed on sub camera image 310. Thereby, only by looking at main camera image 300 in PinP image, the user can grasp the fact that the focusing operation on the subject image that sub camera 170S is capturing is completed. In addition, by displaying in-focus mark 320 on main camera image 300 rather than on sub camera image 310, it is possible to avoid the visibility degradation of sub camera image 310 of comparatively small display size.

Main camera in-focus frame 330 is a display showing that main camera 170M set in AF mode is in focusing operation on the subject surrounded by main camera in-focus frame 330 (focusing operation is not completed). By viewing main camera in-focus frame that is displayed in white, the user can grasp that main camera 170M set in AF mode is in focusing operation on the subject surrounded by main camera in-focus frame 330.

In response to accepting a half-press operation of the release button (step S201), controller 180 starts a focusing operation by driving focus lens 113M in main camera 170M (step S205). In the same manner, controller 180 starts a focusing operation by driving focus lens 113S in sub camera 170S (step S206). The system of focusing operation may be the contrast system, the phase difference system, and other systems.

Controller 180 monitors whether the focusing operations of both main camera 170M and sub camera 170S are completed (step S207). Controller 180 repeats the operation steps from step S204 to step S206 until the focusing operations of both main camera 170M and sub camera 170S are completed, and continues the display where blinking in-focus mark 320 and main camera in-focus frame 330 are superimposed on the through image as shown in screen display B of FIG. 4 ("No" in step S207).

When the determination is made that the focusing operations of both main camera 170M and sub camera 170S are completed ("Yes" in step S207), controller 180 shifts the display contents of display monitor 220 from the display contents shown in screen display B of FIG. 4 to the display contents shown in screen display C of FIG. 4. In this case, as shown in screen display C of FIG. 4, display monitor 220 shifts in-focus mark 320 from the white blinking display to the green lighting display (step S208), and shifts main camera in-focus frame 330 from the white display to the green display (step S209). Lighting display in green of in-focus mark 320 indicates the fact that the focusing operations of both main camera 170M and sub camera 170S are completed. Therefore, by displaying this in-focus mark 320 in green, the user can easily grasp that the focusing operations of both main camera 170M and sub camera 170S are completed, with reference to only focus mark 320. In addition, the green display of main camera in-focus frame 330 indicates that the focusing operation on the subject surrounded by main camera in-focus frame 330 is completed. Therefore, by displaying main camera in-focus frame 330 in green, the user can easily grasp that the focusing operation on the subject surrounded by main camera in-focus frame 330 is completed.

[2-2. Main Camera Set in AF Mode, Sub Camera Set in MF Mode]

Figure 5:
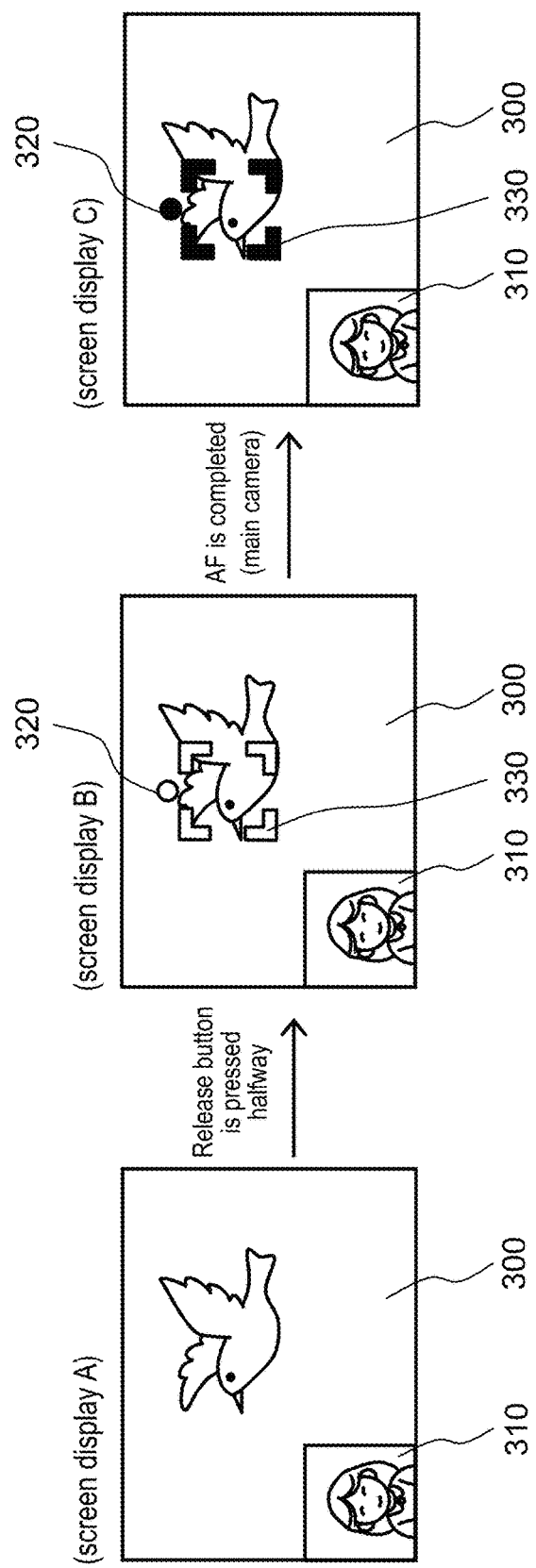
FIG. 5 is a conceptual transition diagram of a screen display when the photographing by the main camera is in AF mode and the photographing by the sub camera is in a manual focus (MF) mode according to the first exemplary embodiment.

Next, the operation when main camera 170M is set in AF mode and sub camera 170S is set in MF mode, and the transition of the display of display monitor 220 will be described with reference to FIGS. 3 and 5. FIG. 5 is a conceptual transition diagram of the screen display when photographing by main camera 170M is in AF mode, and photographing by sub camera 170S is in MF mode.

When in the photographing mode, display monitor 220 displays a through image based on the image data that CMOS image sensors 140M and 140S generate, as shown in screen display A in FIG. 5. Controller 180 monitors whether the release button is pressed halfway (step S201). Before the release button is half-pressed, controller 180 continues the through image display as shown in screen display A of FIG. 5. In this case, main camera 170M is set in AF mode ("Yes" in step S202), and sub camera 170S is set in MF mode ("No" in step S203). For this reason, when the release button is pressed halfway, controller 180 shifts the display contents of display monitor 220 from the display contents shown in screen display A of FIG. 5 to the display contents shown in screen display B of FIG. 5. In this case, as shown in screen display B in FIG. 5, display monitor 220 displays in-focus mark 320 in white while blinking, and displays main camera in-focus frame 330 in white (step S210). In this case, the AF mode setting is only in main camera 170M, and therefore, the blinking display of in-focus mark 320 substantially indicates that main camera 170M is in focusing operation (the focusing operation is not completed). In response to accepting a half-press operation of the release button (step S201), controller 180 starts a focusing operation by driving focus lens 113M in main camera 170M (step S211).

Controller 180 monitors whether the focusing operation of main camera 170M is completed (step S212). Controller 180 repeats the operation steps from step S210 to step S211 until the focusing operation of main camera 170M is completed, and continues the through image display as shown in screen display B of FIG. 5 ("No" in step S212).

When the determination is made that the focusing operation of main camera 170M is completed ("Yes" in step S212), controller 180 shifts the display contents of display monitor 220 from the display contents shown in screen display B of FIG. 5 to the display contents shown in screen display C of FIG. 5. In this case, as shown in screen display C of FIG. 5, display monitor 220 shifts in-focus mark 320 from the white blinking display to the green lighting display (step S213), and shifts main camera in-focus frame 330 from the white display to the green display (step S214).

The green lighting display of in-focus mark 320 indicates the fact that the focusing operation of main camera 170M is completed. In addition, the green display of main camera in-focus frame 330 indicates that the focusing operation on the subject surrounded by main camera in-focus frame 330 is completed. It should be noted that sub camera 170S is set in MF mode, and therefore, that the focus of the subject image which sub camera 170S sets as a capturing target is adjusted, by focus lens 113S being driven appropriately according to the operation of operation member 210 by a user.

[2-3. Main Camera Set in MF Mode, Sub Camera Set in AF Mode]

Figure 6:
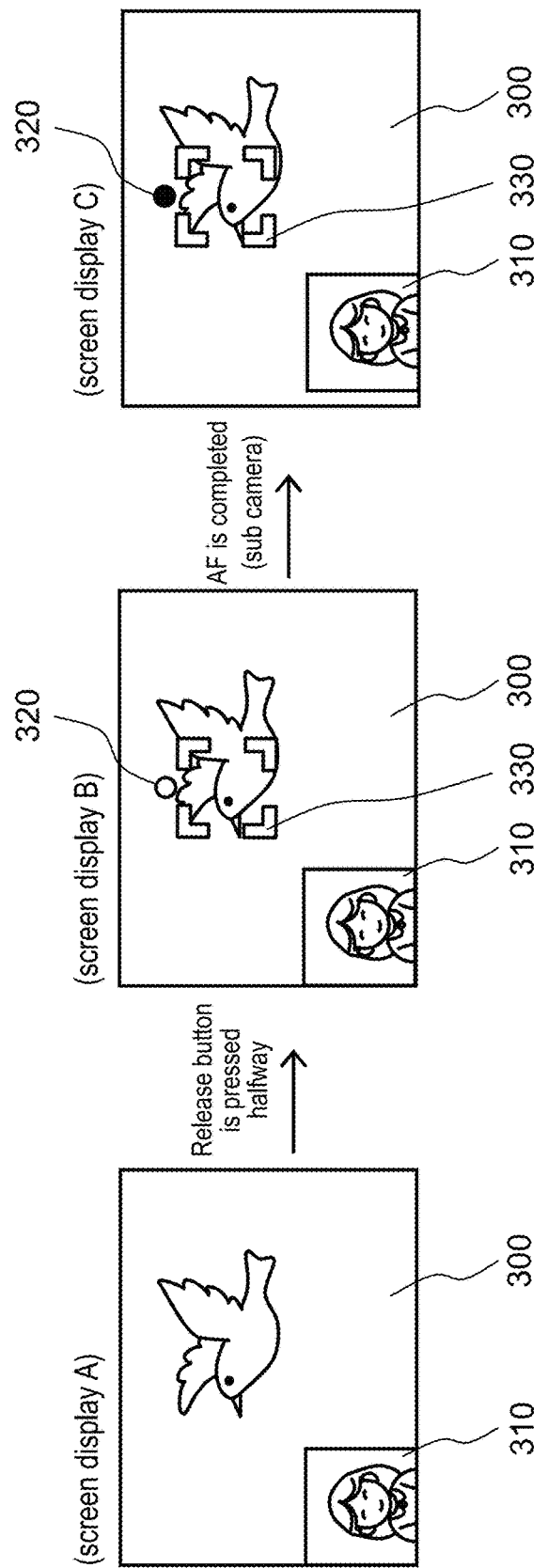
FIG. 6 is a conceptual transition diagram of a screen display when the photographing by the main camera is in MF mode and the photographing by the sub camera is in AF mode according to the first exemplary embodiment.

Next, the operation when main camera 170M is set in MF mode and sub camera 170S is set in AF mode, and the transition of the display of display monitor 220 will be described with reference to FIGS. 3 and 6. FIG. 6 is a conceptual transition diagram of the screen display when photographing by main camera 170M is in MF mode and photographing by sub camera 170S is in AF mode.

When in the photographing mode, display monitor 220 displays a through image based on the image data that CMOS image sensors 140M and 140S generate, as shown in screen display A in FIG. 6. Controller 180 monitors whether the release button is pressed halfway (step S201). Before the release button is half-pressed, controller 180 continues the through image display as shown in screen display A of FIG. 6. In this case, main camera 170M is set in MF mode ("No" in step S202), and sub camera 170S is set in AF mode ("Yes" in step S215). For this reason, when the release button is pressed halfway, controller 180 shifts the display contents of display monitor 220 from the display contents shown in screen display A of FIG. 6 to the display contents shown in screen display B of FIG. 6. In this case, as shown in screen display B in FIG. 6, display monitor 220 displays in-focus mark 320 in white while blinking, and displays main camera in-focus frame 330 in white (step S216). In this case, the AF mode setting is only in sub camera 170S, and therefore, the blinking display of in-focus mark 320 substantially indicates that sub camera 170S is in focusing operation (the focusing operation is not completed). In response to accepting a half-press operation of the release button (step S201), controller 180 starts a focusing operation by driving focus lens 113S in sub camera 170S (step S217).

Controller 180 monitors whether the focusing operation of sub camera 170S is completed (step S218). Controller 180 repeats the operation steps from step S216 to step S217 until the focusing operation of sub camera 170S is completed, and continues the through image display as shown in screen display B of FIG. 6 ("No" in step S218).

When the determination is made that the focusing operation of sub camera 170S is completed ("Yes" in step S218), controller 180 shifts the display contents of display monitor 220 from the display contents shown in screen display B of FIG. 6 to the display contents shown in screen display C of FIG. 6. In this case, as shown in screen display C of FIG. 6, display monitor 220 shifts in-focus mark 320 from the white blinking display to the green lighting display (step S220). On the other hand, main camera in-focus frame 330 continues the white display because main camera 170M is set in MF mode.

The green lighting display of in-focus mark 320 indicates the fact that the focusing operation of sub camera 170S is completed. Although the green lighting display of in-focus mark 320 is the display relating to the focusing operation in sub camera 170S, the lighting display is displayed on main camera image 300, and not displayed on sub camera image 310. Thereby, only by looking at main camera image 300 in PinP image, the user can grasp the fact that the focusing operation on the subject image that sub camera 170S is capturing is completed. In addition, by displaying in-focus mark 320 on main camera image 300 rather than on sub camera image 310, it is possible to avoid the visibility degradation of sub camera image 310 of comparatively small display size.

It should be noted that main camera 170M is set in MF mode, and therefore, that the focus of the subject image which main camera 170M sets as a capturing target is adjusted, by focus lens 113M being driven appropriately according to the operation of operation member 210 by a user.

[2-4. Main Camera Set in MF Mode, Sub Camera Set in MF Mode]

Figure 7:
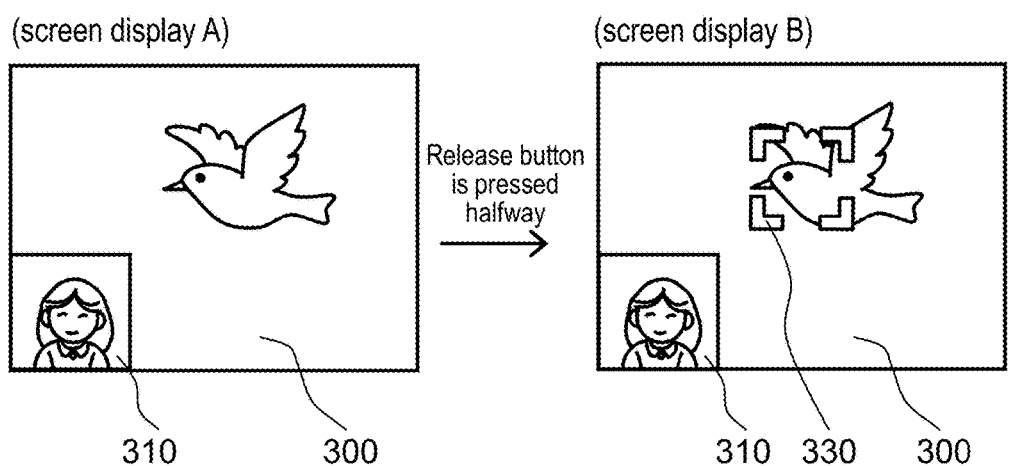
FIG. 7 is a conceptual transition diagram of the screen display when the photographing by the main camera is in MF mode and the photographing by the sub camera is in MF mode according to the first exemplary embodiment.

Finally, the operation when main camera 170M is set in MF mode and sub camera 170S is set in MF mode, and the transition of the display of display monitor 220 will be described with reference to FIGS. 3 and 7. FIG. 7 is a conceptual transition diagram of the screen display when photographing by main camera 170M is in MF mode, and photographing by sub camera 170S is in MF mode.

When in the photographing mode, display monitor 220 displays a through image based on the image data that CMOS image sensors 140M and 140S generate, as shown in screen display A in FIG. 7. Controller 180 monitors whether the release button is pressed halfway (step S201). Before the release button is half-pressed, controller 180 continues the through image display as shown in screen display A of FIG. 7. In this case, main camera 170M is set in MF mode ("No" in step S202), and sub camera 170S is set in MF mode ("No" in step S215). For this reason, when the release button is pressed halfway, controller 180 shifts the display contents of display monitor 220 from the display contents shown in screen display A of FIG. 7 to the display contents shown in screen display B of FIG. 7. In this case, as shown in screen display B in FIG. 7, display monitor 220 displays main camera in-focus frame 330 in white (step S221). In addition, both main camera 170M and sub camera 170S are set in MF mode, and therefore in-focus mark 320, indicating that the focusing operation is being performed or that the focusing operation is completed, is not displayed.

Main camera 170M and sub camera 170S are set in MF mode, and therefore, the focus of the respective subject images which main camera 170M and sub camera 170S set as capturing targets is adjusted, by focus lens 113M and focus lens 113S being driven appropriately according to the operation of operation member 210 by a user.

In the above cases from [2-1] to [2-3], the completion of the focusing operation is notified to the user by changing the display of in-focus mark 320. In either case, by unifying the marks indicating that the focusing operations of main camera 170M and sub camera 170S are completed into in-focus mark 320, the user can easily grasp the completion of the focusing operations of all the camera modules.

In addition, when the display of sub camera image 310 by sub camera 170S is disabled (OFF), display monitor 220 singly performs the display of main camera image 300 by main camera 170M. In this case, in-focus mark 320 is similarly used for the mark indicating the fact that the focusing operation of main camera 170M set in AF mode is being performed, or is completed. That is, when the display of sub camera image 310 is set to either ON or OFF, the user refers to in-focus mark 320 so as to grasp whether the focusing operation of the camera module set in AF mode is being performed or is completed. Thereby, the user may refer to in-focus mark 320 that is commonly displayed in any case, without being affected by the ON/OFF of sub camera image 310, and therefore, the user can reduce the confusion depending on the setting.

3. Effect, Etc.

As has been described above, digital video camera 100 according to the present exemplary embodiment includes display monitor 220, main camera 170M configured to generate a first image data by capturing a subject image, sub camera 170S configured to generate a second image data by capturing a subject image, and controller 180. Controller 180 causes display monitor 220 to display a superimposed image (PinP image) where the image represented by the generated second image data (sub camera image) is superimposed on the image represented by the generated first image data (main camera image), and to display, in the superimposed image (PinP image), the sign that the focusing operation on the subject image being captured by sub camera 170S is completed, on the image represented by the first image data (main camera image) rather than on the image represented by the second image data (sub camera image).

Thereby, the user can grasp the fact that the focusing operation on a subject image being captured by sub camera 170S is completed, by simply looking at main camera image 300 in the superimposed image (PinP image). Therefore, in the imaging device with a plurality of camera modules, the fact that the focusing operations are completed can be notified in a form that is easy for the user to check.

In addition, controller 180 causes display monitor 220 to display the superimposed image (PinP image) such that the area occupied by the image (sub camera image) represented by the generated second image data is smaller than the area occupied by the image (main camera image) represented by the generated first image data in the superimposed image (PinP image).

Thereby, when the sign is displayed that the focusing operation on a subject image being captured by sub camera 170S is completed, it is possible to avoid the visibility degradation of sub camera image 310 with comparatively small display area, and to effectively utilize the display range of main camera image 300 with comparatively large display area. Therefore, in the imaging device with a plurality of camera modules, the fact that the focusing operations are completed can be notified in a form that is easy for the user to check.

In addition, while the focusing operation on a subject image being captured by main camera 170M is being performed, when both the focusing operation on a subject image being captured by main camera 170M, and the focusing operation on a subject image being captured by sub camera 170S are completed, controller 180 causes display monitor 220 to display the sign that the focusing operation on a subject image being captured by sub camera 170S is completed.

Thereby, the user can easily grasp that both the focusing operation on a subject image being captured by main camera 170M, and the focusing operation on a subject image being captured by sub camera 170S are completed. Therefore, in the imaging device with a plurality of camera modules, the fact that the focusing operations are completed can be notified in a form that is easy for the user to check.

4. Other Exemplary Embodiments

As described above, the first exemplary embodiment is described as an example of the technology disclosed in the present application. However, the technology in the present disclosure is not limited to this, and is also applicable to exemplary embodiments where modification, replacement, addition, omission, and the like are appropriately performed. In addition, combining each of the components described in the first exemplary embodiment into a new exemplary embodiment is also possible. Thus, in the following, other exemplary embodiments will be exemplified.

In the first exemplary embodiment, optical systems 110M and 110S include zoom lenses 111M and 111S, image stabilization lenses 112M and 112S, focus lenses 113M and 113S, and apertures 114M and 114S, but this configuration is not essential. In performing the auto focus, the technology of the present disclosure can be applied as long as optical systems include at least focus lenses 113M and 113S.

In the first exemplary embodiment, by operating operation member 210 (operation dial, for example), the user can instruct each of main camera 170M and sub camera 170S on the corresponding switching of MF mode/AF mode, but the present disclosure is not limited to this. Main camera 170M is not required to include the switching of the AF mode/MF mode setting, and sub camera 170S is preferred to include the AF mode setting.

Figure 8:
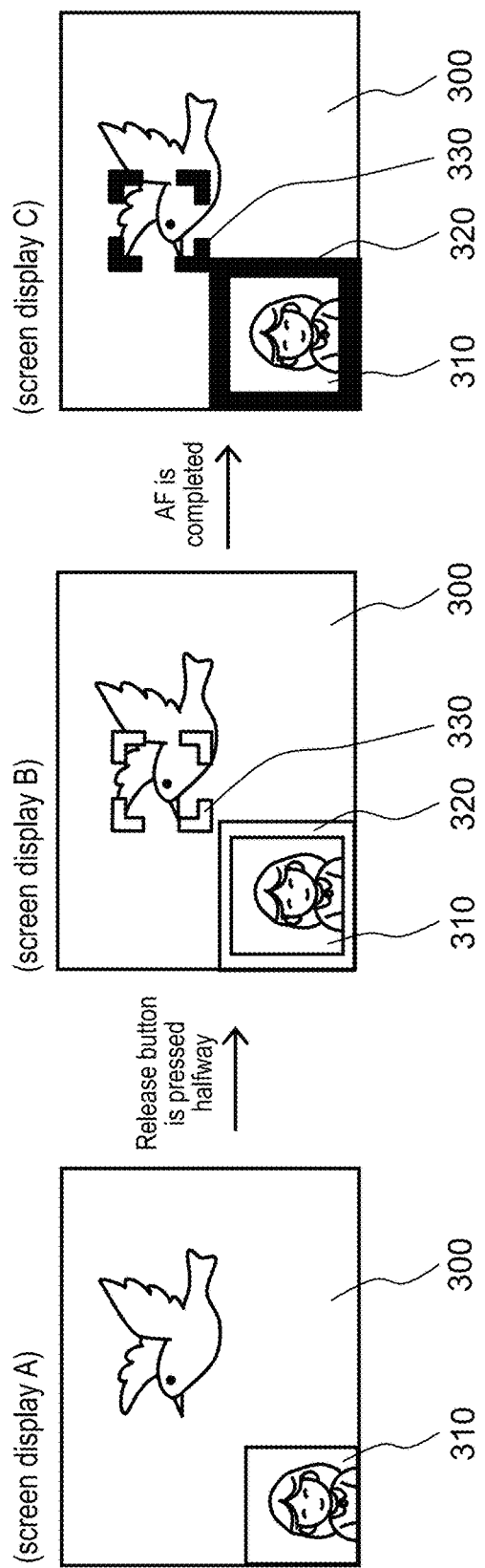
FIG. 8 is a conceptual transition diagram of a screen display of an in-focus mark according to another exemplary embodiment.

In the first exemplary embodiment, in-focus mark 320 indicating the fact that the focusing operation of sub camera 170S is being performed or completed, is displayed on main camera image 300 rather than on sub camera image 310. However, in-focus mark 320 is at least sufficient not to be displayed on sub camera image 310, and as shown in FIG. 8, the fact that the focusing operation is being performed (screen display B in FIG. 8) or that the focusing operation is completed (screen display C in FIG. 8) may be indicated, by setting the frame itself of sub camera image 310 in the PinP image to in-focus mark 320, and changing the color and the like of the frame. That is, in superimposed image (PinP image), the form, with which to display the sign that the focusing operation on a subject image being captured by sub camera 170S is completed on the image represented by the first image data (main camera image) rather than on the image represented by the second image data (sub camera image), includes the change of displaying the boundary between the image represented by the second image data and the image represented by the first image data.

In addition, in-focus mark 320 indicating the fact that the focusing operation of sub camera 170 is being performed or completed, may be displayed neither on sub camera image 310 nor on main camera image 300, but in any location on the screen with higher visibility.

In the first exemplary embodiment, when the release button is pressed halfway, in-focus mark 320 having a circular shape is displayed in white while blinking, and main camera in-focus frame 330 having a rectangular shape is displayed in white. In addition, when the focusing operation is completed, in-focus mark 320 is lit in green, and main camera in-focus frame 330 is displayed in green. However, the present disclosure is not limited to this. The color of the display may be used with other colors, and the shape of the display may be used with other shapes. That is, another display mode may be used as long as the display mode can identify a change of state, according to the timing at which the focusing operation is completed when the release button is pressed halfway.

Figure 9:
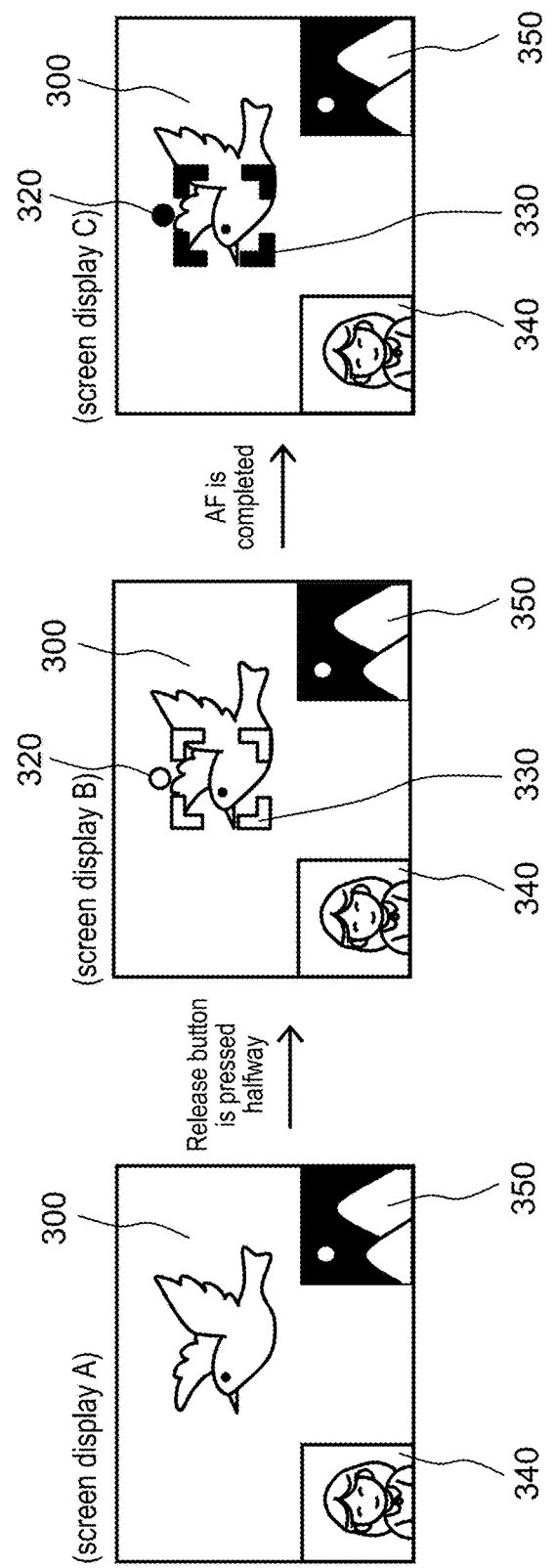
FIG. 9 is a conceptual transition diagram of a screen display (with a main camera in-focus frame) when the digital video camera is equipped with three camera modules according to still another exemplary embodiment.

In the first exemplary embodiment, digital video camera 100 includes two camera modules of main camera 170M and sub camera 170S, but may include three or more camera modules. For example, digital video camera 100 may include a first sub camera 170S-1 and a second sub camera 170S-2 in addition to main camera 170M. In this case, as shown in screen display A in FIG. 9, display monitor 220 displays a PinP image obtained by superimposing first sub camera image 340 by first sub camera 170S-1 and second sub camera image 350 by second sub camera 170S-2 on main camera image 300 by main camera 170M. When receiving the half-press of the release button, controller 180 shifts the display contents of display monitor 220 from the display contents shown in screen display A in FIG. 9 to the display contents shown in screen display B in FIG. 9. In this case, as shown in screen display B in FIG. 9, display monitor 220 displays in-focus mark 320 in white while blinking, and displays main camera in-focus frame 330 in white. And, when the determination is made that all of the focusing operations of main camera 170M, first sub-camera 170S-1, and second sub-camera 170S-2 which are set in AF mode are completed, controller 180 shifts the display contents of display monitor 220 from the display contents shown in screen display B of FIG. 9 to the display contents shown in screen display C of FIG. 9. In this case, as shown in screen display C of FIG. 9, display monitor 220 shifts in-focus mark 320 from the white blinking display to the green lighting display, and shifts main camera in-focus frame 330 from the white display to the green display.

The white blinking display of in-focus mark 320 is a display indicating that the focusing operation of at least one of main camera 170M, first sub camera 170S-1, and second sub camera 170S-2, which are set in AF mode, is being performed (the focusing operation is not completed). The user can grasp that the focusing operation of at least one of main camera 170M, first sub camera 170S-1, and second sub camera 170S-2, which are set in AF mode, is being performed, by viewing the white blinking display of in-focus mark 320. In addition, the green lighting display of in-focus mark 320 is a display indicating that all of the focusing operations of main camera 170M, first sub camera 170S-1, and second sub camera 170S-2, which are set in AF mode, are completed. The user can grasp that all of the focusing operations of main camera 170M, first sub camera 170S-1, and second sub camera 170S-2, which are set in AF mode, are completed, by viewing the green lighting display of in-focus mark 320.

Although the white blinking display and the green lighting display of in-focus mark 320 are the displays relating to the focusing operations of first sub camera 170S-1 and second sub camera 170S-2, the displays are performed neither on first sub-camera image 340 nor on second sub camera image 350, but on main camera image 300. Thereby, by looking at only main camera image 300 in PinP image, the user can grasp the fact that the focusing operations on the subject image being captured by first sub camera 170S-1 and second sub camera 170S-2 are completed. In addition, by displaying in-focus mark 320 on main camera image 300 rather than on first sub camera image 340 and second sub camera image 350 of comparatively small display size, it is possible to avoid the visibility degradation of first sub camera image 340 and second sub camera image 350 of comparatively small display size.

In addition, in the first exemplary embodiment, when the focusing operation is completed, in-focus mark 320 is shifted to the green lighting display, but also when the focusing operation times out, in-focus mark 320 may be shifted to the green lighting display.

Figure 10:
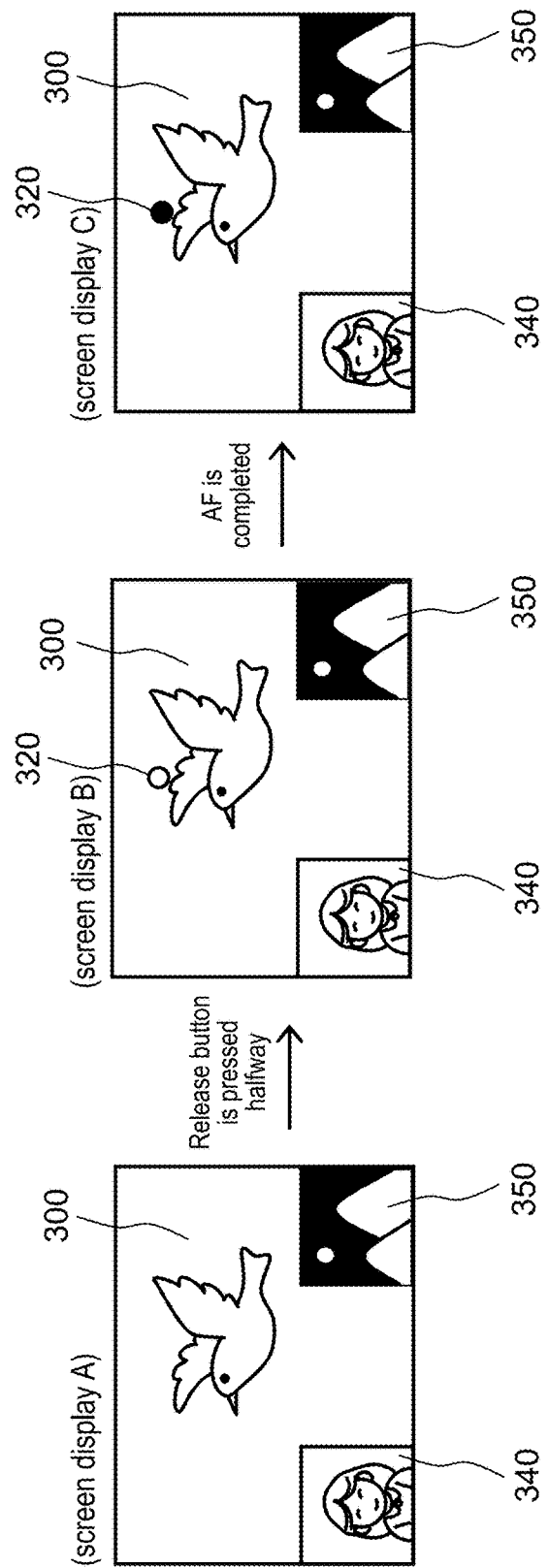
FIG. 10 is a conceptual transition diagram of a screen display (without a main camera in-focus frame) when the digital video camera is equipped with three camera modules according to yet another exemplary embodiment.

In the first exemplary embodiment, a case of displaying main camera in-focus frame 330 is exemplified, but this is not an essential component. As shown in FIG. 10, in-focus mark 320 may be displayed singly.

In the first exemplary embodiment, the white blinking display of in-focus mark 320 is a display indicating that the focusing operation of at least one of main camera 170M and sub camera 170S which are set in AF mode is being performed (the focusing operation is not completed). In addition, the green lighting display of in-focus mark 320 indicates the fact that the focusing operations of both main camera 170M and sub camera 170S are completed. However, the present disclosure is not limited to this, and as shown in FIG. 11, each of in-focus mark 320M indicating that the focusing operation of main camera 170M is being performed, and is completed, and in-focus mark 320S indicating that the focusing operation of sub camera 170S is being performed, and is completed, may be displayed independently. In this case, upon receiving the half-press of the release button, controller 180 causes display monitor 220 to independently display each of in-focus mark 320M indicating the fact that the focusing operation of main camera 170M is being performed, and in-focus mark 320S indicating the fact that the focusing operation of sub camera 170S is being performed. That is, controller 180 shifts the display contents of display monitor 220 from the display contents shown in screen display A of FIG. 11 to the display contents shown in screen display B of FIG. 11. And, controller 180 sequentially shifts in-focus marks 320M or 320S which corresponds to the camera module in which the focusing operation is completed from among main camera 170M and sub camera 170S to the green lighting display. That is, after shifting the display contents of display monitor 220 from the display contents shown in screen display B of FIG. 11 to the display contents shown in screen display C of FIG. 11, controller 180 successively shifts the display contents shown in screen display C to the display contents shown in display screen D in FIG. 11. In this case, in-focus mark 320S indicating the fact that the focusing operation of sub camera 170S is being performed is displayed on main camera image 300 rather than on sub camera image 310. Thereby, the user can grasp the situation of the focusing operation of sub camera 170S only by viewing main camera image 300. In addition, by displaying in-focus marks 320M and 320S on main camera image 300 rather than on sub camera image 310, it is possible to avoid the visibility degradation of sub camera image 310 of comparatively small display size.

In the first exemplary embodiment, the information about the focusing operation of sub camera 170S is displayed on main camera image 300, but the present disclosure is not limited to this. Other information about sub camera 170S as well as the information about the focusing operation may be displayed on main camera image 300 other than sub camera image 310. As other information, for example, there is information about the automatic exposure and the automatic white balance correction. For example, as for information about the automatic exposure, when the release button of digital video camera 100 is pressed halfway, the automatic exposure mark is displayed on main camera image 300, and when main camera 170M and sub camera 170S become from a state during automatic exposure operation to a state of automatic exposure completion, the display of the automatic exposure mark can be changed.

In addition, in the first exemplary embodiment, when sub camera 170S becomes from a state during focusing operation to a state of focusing operation completion, the display of in-focus mark 320 is switched from a white blinking display to a green lighting display, but the present disclosure is not limited to this. As the information about sub camera 170S, for example, the information about whether each setting including AF mode, automatic exposure, and automatic white balance correction is completed, may be simply displayed on main camera image 300 other than sub camera image 310.

Figure 12A:
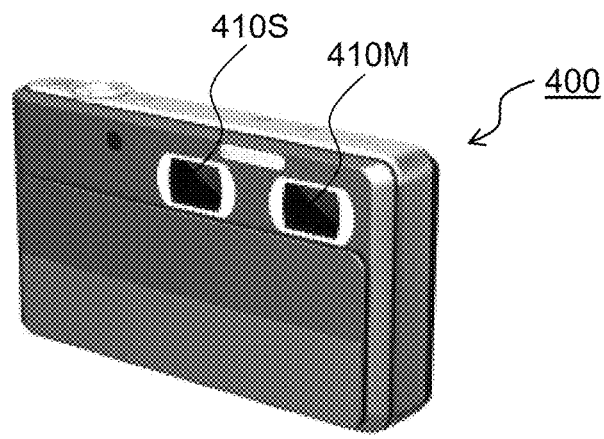
FIGS. 12A to 12C are perspective views each showing an imaging device according to yet another exemplary embodiment.

In addition, in the first exemplary embodiment, as shown in FIG. 1, main camera 170M is disposed on the subject side of camera body 171, and sub camera 170S is disposed at the end of display monitor 220 on the opposite side of camera body 171, but the present disclosure is not limited to this. Main camera 170M and sub camera 170S may be disposed side by side on the subject side of the camera body, in the same manner as compound eye cameras 410M and 410S of imaging device 400 for 3D photographing shown in FIG. 12A. In addition, main camera 170M and sub camera 170S may be a system of in-camera 510S and out-camera 510M, in the same manner as imaging device 500 such as a mobile phone and a smartphone shown in FIGS. 12B and 12C.

In addition, in the first exemplary embodiment, display monitor 220, main camera 170M, sub camera 170S, and controller 180 are integrally included in digital video camera 100, but the present disclosure is not limited to this. At least one of display monitor 220, main camera 170M, sub camera 170S and controller 180 is an independent unit, and the present disclosure is also applicable to the imaging system combined by wired or wireless connection of these units.

Figure 12B:
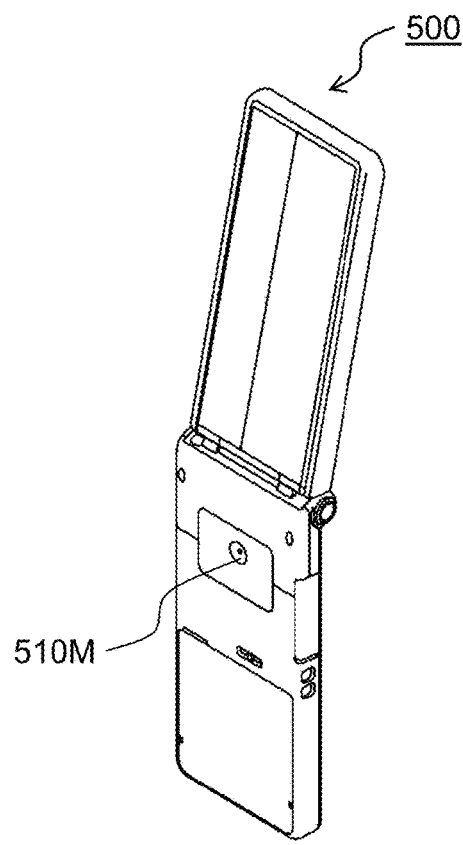
Figure 12C:
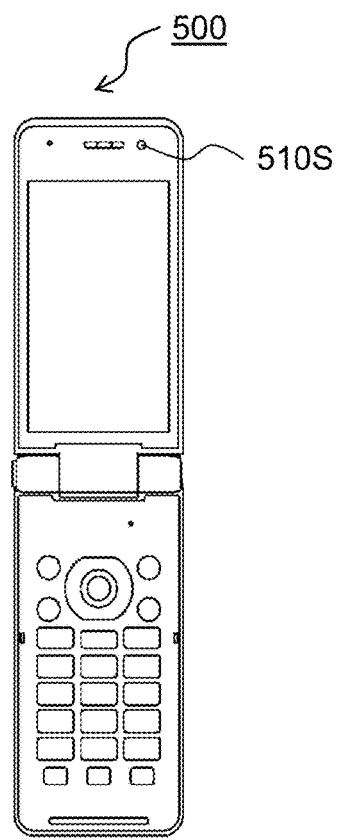

For example, the image data photographed by out-camera 510M or in-camera 510S Of imaging device 500 shown in FIGS. 12B and 12C may be sent to digital video camera 100 in wireless communication, and the received image data may be displayed by being superimposed on display monitor 220 of digital video camera 100 as a sub camera image. In this case, the images photographed by imaging device 500 may be displayed in the same manner as sub camera image 310 shown in FIG. 4, and may be displayed in the same manner as second sub camera image 350 shown in FIG. 9. In addition, in this case, digital video camera 100 is not necessarily required to include sub camera 170S.

As described above, the exemplary embodiments have been described as examples of the technology in the present disclosure. To this end, accompanying drawings and a detailed description have been provided.

Therefore, among the components described in the accompanying drawings and the detailed description, not only the components that are essential for solving problems, but also the components that are not essential for solving problems so as to exemplify the technology, may also be included. For this reason, it should not be immediately admitted that these non-essential components are essential, based on the fact that these non-essential components are described in the accompanying drawings and the detailed description.

In addition, the above-described exemplary embodiments are intended to exemplify the technology in the present disclosure, and therefore, various modifications, replacement, addition, omission, and the like can be performed in the scope of the claims or the equivalents of the claims.

What is claimed is:

1. An imaging device comprising:
a display unit;
a first imaging sensor configured to generate a first image data by capturing a subject image;
a second imaging sensor configured to generate a second image data by capturing a subject image; and
a controller configured to cause the display unit to display a display image including at least a superimposed image obtained by superimposing an image represented by the generated second image data on an image represented by the generated first image data, and to display a sign which represents state transition of a focusing operation on the subject image being captured by the second imaging sensor, in a position other than on the image represented by the second image data in the display image including at least the superimposed image, wherein
the display of the sign varies depending on a state of a first focus mode associated with the first imaging sensor and a state of a second focus mode associated with the second imaging sensor.

2. The imaging device according to claim 1, wherein the controller causes the display unit to display the sign that the focusing operation on the subject image being captured by the second imaging sensor is completed, on the image represented by the first image data rather than on the image represented by the second image data in the display image including at least the superimposed image.

3. The imaging device according to claim 1, wherein the controller causes the display unit to display the superimposed image so that an area occupied by the image represented by the generated second image data is smaller than an area occupied by the image represented by the generated first image data in the superimposed image.

4. The imaging device according to claim 1, wherein, if a focusing operation is performed on the subject image being captured by the first imaging sensor, the controller causes the display unit to display the sign that the focusing operation on the subject image being captured by the second imaging sensor is completed, when both the focusing operation on the subject image being captured by the first imaging sensor and the focusing operation on the subject image being captured by the second imaging sensor are completed.

5. The imaging device according to claim 1, wherein a form, with which to display the sign that the focusing operation on the subject image being captured by the second imaging sensor is completed in the position other than on the image represented by the second image data in the display image including at least the superimposed image, includes a change of displaying a boundary between the image represented by the second image data and the image represented by the first image data.

6. The imaging device according to claim 1, wherein the first focus mode includes an auto focus mode and a manual focus mode, and the second focus mode includes the auto focus mode and the manual focus mode.

7. The imaging device according to claim 6, wherein, when the state of the first focus mode is the manual focus mode and the state of the second focus mode is the manual focus mode, the sign is not displayed.

8. The imaging device according to claim 1, wherein the controller is further configured to display a second sign that a focusing operation on the subject image being captured by the first imaging sensor is completed, in a second position other than on the image represented by the second image data in the display image including at least the superimposed image.

9. The imaging device according to claim 8, wherein, during the focusing operation, the sign and the second sign are displayed simultaneously on the image represented by the first data in the display image including at least the superimposed image.

10. The imaging device according to claim 9, wherein the position of the sign is immediately adjacent to the second position of the second sign on the image represented by the first data in the display image including at least the superimposed image.

11. The imaging device according to claim 1, wherein a first form of the sign before the focusing operation on the subject image being captured by the second imaging sensor is completed is different than a second form of the sign after the focusing operation on the subject image being captured by the second imaging sensor is completed.

12. An imaging device comprising:
a display unit;
a first imaging sensor configured to generate a first image data by capturing a subject image;
a second imaging sensor configured to generate a second image data by capturing a subject image; and
a controller configured to cause the display unit to display a display image including at least a superimposed image obtained by superimposing an image represented by the generated second image data on an image represented by the generated first image data, and to display information which represents state transition of a predetermined operation of the imaging device as information related to the subject image being captured by the second imaging sensor, in a position other than on the image represented by the second image data in the display image including at least the superimposed image.

13. The imaging device according to claim 12, wherein the predetermined operation of the imaging device includes at least one of information related to auto focus, automatic exposure, and automatic white balance correction.

14. An imaging device comprising:
a display unit;
a first imaging sensor configured to generate a first image data by capturing a subject image;
a second imaging sensor configured to generate a second image data by capturing a subject image; and
a controller configured to cause the display unit to display a display image including at least a superimposed image obtained by superimposing an image represented by the generated second image data on an image represented by the generated first image data, and to display a sign which represents state transition of a focusing operation on the subject image being captured by the second imaging sensor, in a position other than on the image represented by the second image data in the display image including at least the superimposed image, wherein a first form of the sign before the focusing operation on the subject image being captured by the second imaging sensor is completed is different than a second form of the sign after the focusing operation on the subject image being captured by the second imaging sensor is completed.

15. An imaging device comprising:

a display unit;

a first imaging sensor configured to generate a first image data by capturing a subject image;

a second imaging sensor configured to generate a second image data by capturing a subject image; and a controller configured to cause the display unit to display a display image including at least a superimposed image obtained by superimposing an image represented by the generated second image data on an image represented by the generated first image data, to display a first sign which represents state transition of a focusing operation on the subject image being captured by the first imaging sensor, in a position on the image represented by the first image data in the display image including at least the superimposed image, and to display a second sign which represents state transition of a focusing operation on the subject image being captured by the second imaging sensor, in a position other than on the image represented by the second image data in the display image including at least the superimposed image.

16. The imaging device according to claim 15, wherein a shape of the first sign is different than a shape of the second sign.

* * * * *